(12) United States Patent
Suzuki et al.

(10) Patent No.: US 9,889,817 B2
(45) Date of Patent: Feb. 13, 2018

(54) STEERING LOCK DEVICE

(71) Applicant: ASAHI DENSO CO., LTD., Hamamatsu-shi, Shizuoka (JP)

(72) Inventors: Michiyuki Suzuki, Hamamatsu (JP); Yusuke Sawaki, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 0 days.

(21) Appl. No.: 15/334,602

(22) Filed: Oct. 26, 2016

(65) Prior Publication Data

US 2017/0113651 A1    Apr. 27, 2017

(30) Foreign Application Priority Data

Oct. 27, 2015   (JP) ................................. 2015-210580
Oct. 27, 2015   (JP) ................................. 2015-210581

(51) Int. Cl.
  *B60R 25/021*    (2013.01)
  *B60R 25/0215*   (2013.01)
  *B62H 5/02*      (2006.01)

(52) U.S. Cl.
  CPC ........ *B60R 25/021* (2013.01); *B60R 25/0215* (2013.01); *B60R 25/02153* (2013.01); *B62H 5/02* (2013.01)

(58) Field of Classification Search
  CPC ... B62H 5/02; B60R 25/021; B60R 25/02153; B60R 25/02; B60R 25/0211;

(Continued)

(56) References Cited

U.S. PATENT DOCUMENTS 5,896,765 A * 4/1999 Peyre ................ B60R 25/02153
                                                    292/144
6,354,118 B1 * 3/2002 Frick ................ B60R 25/02153
                                                    70/186

(Continued)

FOREIGN PATENT DOCUMENTS

DE      19961975 C1 * 12/2000 ....... B60R 25/02153
DE      10103182 A1    7/2002

(Continued)

OTHER PUBLICATIONS

Extended European Search Report issued in Patent Application No. EP 16 19 5934 dated Mar. 10, 2017.

*Primary Examiner* — Suzanne L Barrett
(74) *Attorney, Agent, or Firm* — Pearne & Gordon LLP

(57) ABSTRACT

A steering lock device includes a lock bar attached to a case member, a motor having an output shaft, a driving gear member which is attached to the output shaft of the motor and which is rotatable together with the output shaft, a driven gear member which is assembled in a state of being meshed with the driving gear member, and which is rotatable in a direction corresponding to a rotation direction of the driving gear member, and a feed screw member which is connected coaxially with the lock bar, which has a male thread screwed with a female thread of the driven gear member and which is capable of causing the lock bar to advance or retreat in an axial direction by the rotation of the driven gear member. The motor, the feed screw member and the lock bar are accommodated in parallel within the case member.

3 Claims, 10 Drawing Sheets

(58) Field of Classification Search
CPC .......... B60R 25/02142; B60R 25/0215; B60R 25/24; B60R 25/02115; B60R 25/02118; B60R 2325/306; B60R 25/02107; Y10T 70/5956; Y10T 70/565; Y10T 70/5659
USPC .......................................... 70/182–186, 252
See application file for complete search history.

(56) References Cited

U.S. PATENT DOCUMENTS

| | | | | |
|---|---|---|---|---|
| 6,439,011 | B1* | 8/2002 | Frick | B60R 25/02153 70/185 |
| 7,021,093 | B2* | 4/2006 | Fukatsu | B60R 25/02153 70/186 |
| 7,140,213 | B2* | 11/2006 | Feucht | B60R 25/02153 70/186 |
| 8,230,964 | B2* | 7/2012 | Markfort | B60R 25/0211 180/443 |
| 8,833,119 | B2* | 9/2014 | Noma | B60R 25/002 70/183 |
| 8,960,046 | B2* | 2/2015 | Engel | B60R 25/02147 74/388 R |
| 2001/0025516 | A1 | 10/2001 | Starken | |
| 2002/0023468 | A1* | 2/2002 | Frick | B60R 25/02153 70/185 |
| 2002/0108412 | A1* | 8/2002 | Starken | B60R 25/02153 70/275 |
| 2004/0182121 | A1* | 9/2004 | Fukatsu | B60R 25/02153 70/186 |
| 2005/0138977 | A1 | 6/2005 | Suzuki et al. | |
| 2005/0183476 | A1* | 8/2005 | Feucht | B60R 25/02153 70/186 |
| 2008/0047309 | A1* | 2/2008 | Okuno | B60R 25/02153 70/252 |
| 2008/0098777 | A1* | 5/2008 | Tanioka | B60R 25/02153 70/184 |
| 2011/0088963 | A1* | 4/2011 | Markfort | B60R 25/0211 180/444 |
| 2013/0133449 | A1* | 5/2013 | Noma | B60R 25/002 74/89.34 |
| 2013/0255431 | A1* | 10/2013 | Engel | B60R 25/02147 74/495 |
| 2013/0276488 | A1* | 10/2013 | Haber | E05B 47/0012 70/57.1 |

FOREIGN PATENT DOCUMENTS

| | | | |
|---|---|---|---|
| DE | 102004045760 A1 | 4/2006 | |
| DE | 102012106076 A1 | 1/2013 | |
| EP | 1 029 755 A2 | 8/2000 | |
| EP | 1 110 828 A2 | 6/2001 | |
| FR | 2748054 A1 * | 10/1997 | ....... B60R 25/02153 |
| JP | H08-052635 A | 2/1996 | |
| JP | H10-306864 A | 11/1998 | |
| JP | 2005-075307 A | 3/2005 | |
| JP | 2006-327304 A | 12/2006 | |
| KR | 2009-0100729 A | 9/2009 | |
| KR | 2015-0025076 A | 3/2015 | |
| WO | 03-099613 A2 | 12/2003 | |

* cited by examiner

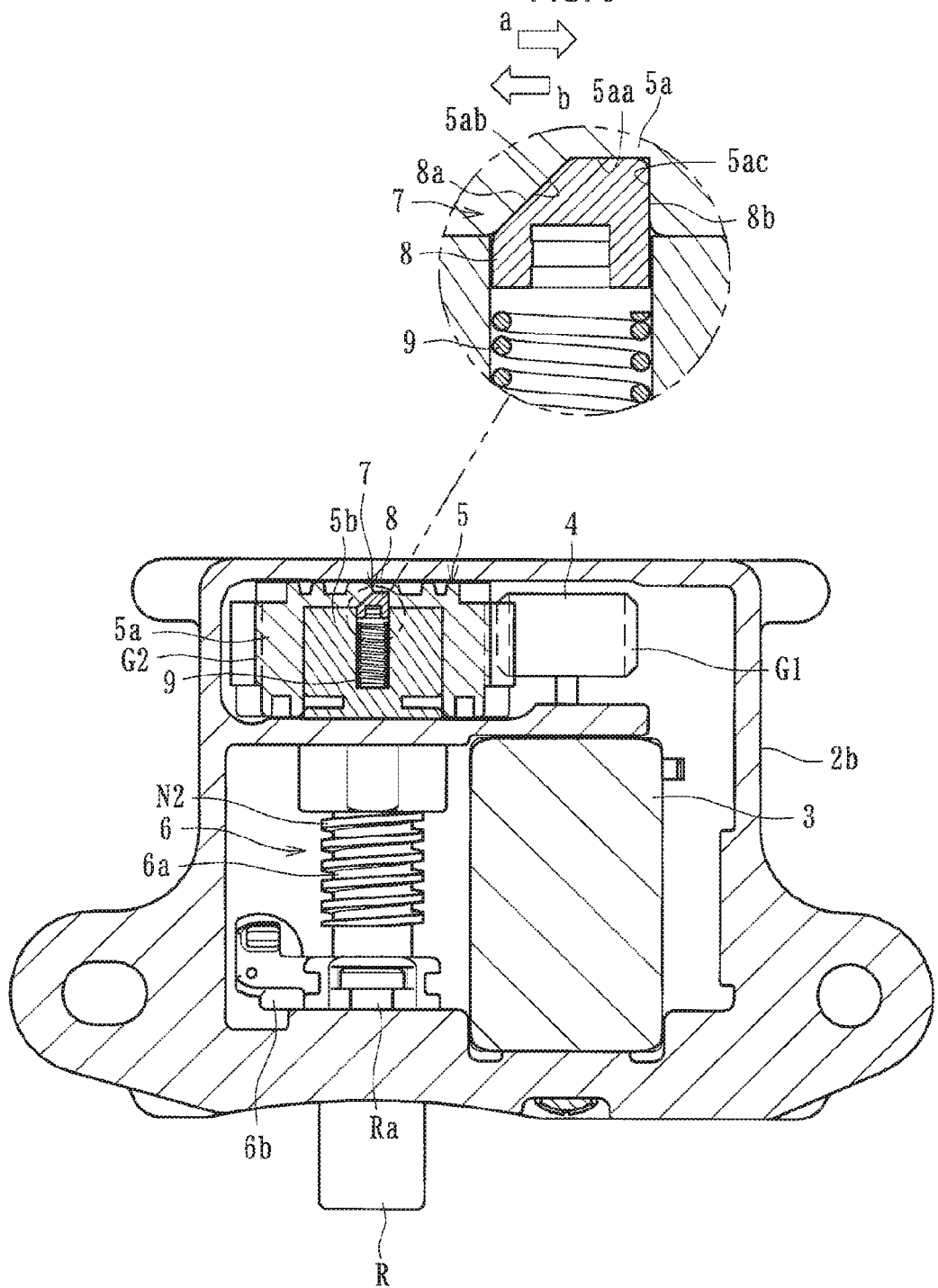

STEERING LOCK DEVICE

CROSS-REFERENCE TO RELATED APPLICATION

The present application claims priority from Japanese Patent Application No. 2015-210580 filed on Oct. 27, 2015 and Japanese Patent Application No. 2015-210581 filed on Oct. 27, 2015, the entire content of which is incorporated herein by reference.

BACKGROUND

Technical Field

The present invention relates to a steering lock device for performing the steering lock and release thereof by the driving of a motor.

Related Art

In order to prevent the vehicle theft frequently occurring in recent years, a so-called smart entry system has been suggested which includes a transmitting means portable by a driver and capable of transmitting a vehicle-specific ID code and a receiving means capable of receiving the ID code and which enables various vehicle-operations including an engine start under the condition that the ID code received by the receiving means is a regular one. For example, in the case of a smart entry system of a motorcycle, when a driver carrying a transmitting means (electronic key) operates an access key, a receiving means on the vehicle side receives the ID code transmitted from the transmitting means and it is determined whether or not the ID code is a regular one registered in advance.

Then, when it is determined that the received ID code is the regular ID code, a power supply of a vehicle is turned on and an engine is started by pressing a start button or the like. In this way, it is possible to enable various vehicle-operations including an engine start without using a mechanical key such as an ignition key. Further, it is possible to reliably prevent the theft of a vehicle or an illegal operation for a vehicle, or the like.

By the way, in a motorcycle or the like, typically, a steering lock device is provided which performs the steering lock by rotating an ignition key inserted through a key hole in a predetermined direction and thus locking a lock bar to a steering (a rotation shaft of a handle bar, or the like). However, this steering lock device is difficult to be applied to a vehicle including a smart entry system where an operation by the ignition key as described above is not required.

Therefore, the present applicant has suggested a steering lock device as disclosed in Patent Documents 1 and 2, for example. According to this related-art steering lock device, the steering lock is performed by a manual operation to press a press button and the release of the steering lock is performed by an electric power. Therefore, a mechanical key such as an ignition key is not required at the time of performing the steering lock and release thereof, and thus, the steering lock device can be easily applied to a smart entry system.

Patent Document 1: Japanese Patent Laid-Open Publication No. 2005-075307

Patent Document 2: Japanese Patent Laid-Open Publication No. 2006-327304

However, in the related-art steering lock device, the steering lock is released in such a way that the driving force of the motor is transmitted to a cam or a latch mechanism, and thus, the lock bar is retreated from the projected state to the retracted state. Therefore, an actuation space for the cam or the latch mechanism is required, and hence, there is a problem that the whole size of the device is increased.

However, in the related-art steering lock device, it is required to press an operation button at the time of performing the steering lock, and thus, there is a problem that it is not possible to perform both the steering lock and the release thereof by an electric power. Thus, the present applicant has considered that both the steering lock and the release thereof are caused to be performed by an electric power by transmitting the driving force of the motor to the feed screw member via the gear member and causing the lock bar to advance or retreat. However, in this case, an overload occurs when the locking of the lock bar to the steering is not favorably performed at the time of causing the lock bar to advance, and thus, there is a problem that defects occur in the motor or the like.

SUMMARY

Exemplary embodiments of the invention provide a steering lock device which is capable of performing both the steering lock and the release thereof by an electric power and which is capable of reducing the whole size of the device.

Exemplary embodiments of the invention also provide a steering lock device which is capable of performing both the steering lock and the release thereof by an electric power and which is capable of preventing defects from occurring in the motor or the like even when the locking of the lock bar to the steering is not favorably performed.

A steering lock device according to a first aspect of an exemplary embodiment of the invention, which performs a steering lock in such a way that a lock bar is advanced into a projected state and is thus locked to a steering of a vehicle, and releases the steering lock in such a way that the lock bar is retreated into a retracted state and the locking of the lock bar to the steering is thus released, the steering lock device comprises:

a case member;

a lock bar attached to the case member;

a motor having an output shaft which is arbitrarily rotatable in a normal direction and in a reverse direction;

a driving gear member which is attached to the output shaft of the motor and which is rotatable together with the output shaft;

a driven gear member which is assembled in a state of being meshed with the driving gear member, which is rotatable in a direction corresponding to a rotation direction of the driving gear member and which has a female thread; and a feed screw member which is connected coaxially with the lock bar, which has a male thread screwed with the female thread of the driven gear member and which is capable of causing the lock bar to advance or retreat in an axial direction by the rotation of the driven gear member, wherein the motor, the feed screw member and the lock bar are accommodated in parallel within the case member.

In a second aspect of an exemplary embodiment of the invention, the steering lock device may further comprise:

a retracted state detection module configured to detect the retracted state of the lock bar; and a projected state detection module configured to detect the projected state of the lock bar, wherein the driving of the motor is stopped under the condition that the retracted state detection module or the projected state detection module detects the retracted state or projected state of the lock bar.

In a third aspect of an exemplary embodiment of the invention, a magnet may be attached to the feed screw member, and the retracted state detection module and the projected state detection module may comprise magnetic sensors configured to detect the retracted state and the projected state of the lock bar by detecting the magnetism of the magnet.

In a fourth aspect of an exemplary embodiment of the invention, the steering lock device may further comprise:
an overload protection module configured to block the transmission of a driving force of the motor to the lock bar when an overload occurs in the course of the lock bar being advanced.

In a fifth aspect of an exemplary embodiment of the invention, the driven gear member may comprise a first driven gear member having a gear which is meshed with the driving gear member and a second driven gear member having the female thread, and the overload protection module comprises a torque limiter which is interposed between the first driven gear member and the second driven gear member, and
when an overload occurs in the lock bar, the first driven gear member may be idled with respect to the second driven gear member.

According to the first aspect of the invention, the lock bar can be advanced and retreated in accordance with the rotation direction of the output shaft of the motor. Therefore, both the steering lock and the release thereof can be performed by an electric power. Further, the motor, the feed screw member and the lock bar are accommodated in parallel within the case member. Therefore, it is possible to reduce the whole size of the device.

According to the second aspect of the invention, the retracted state detection module for detecting the retracted state of the lock bar and the projected state detection module for detecting the projected state of the lock bar are provided, and the driving of the motor is stopped under the condition that the retracted state detection module or the projected state detection module detects the retracted state or projected state of the lock bar. Therefore, the lock bar can be reliably in the retracted state or the projected state.

According to the third aspect of the invention, the magnet is attached to the feed screw member, and the retracted state detection module and the projected state detection module are composed of magnetic sensors capable of detecting the retracted state and the projected state of the lock bar by detecting the magnetism of the magnet. Therefore, it is possible to detect the retracted state or the projected state of the lock bar in a non-contact manner.

According to the fourth aspect of the invention, the overload protection module is provided which is capable of blocking the transmission of the driving force of the motor to the lock bar when an overload occurs in the course of the lock bar being advanced. Therefore, it is possible to prevent defects from occurring in the motor or the like even when the locking of the lock bar to the steering is not favorably performed.

According to the fifth aspect of the invention, the overload protection module comprises a torque limiter which is interposed between the first driven gear member and the second driven gear member. When an overload occurs in the lock bar, the first driven gear member is idled with respect to the second driven gear member. In this way, it is possible to more reliably protect the motor or the like from the overload by a simple structure.

BRIEF DESCRIPTION OF THE DRAWINGS

FIG. 5A is a schematic view showing a state where a lock bar is projected and FIG. 5B is a schematic view showing a state where the lock bar is retracted.

FIG. 8A is a schematic view showing a state where the lock bar is projected and FIG. 8B is a schematic view showing a state where the lock bar is retracted.

FIG. 9 is a sectional view taken along a line IX-IX shown in FIG. 7.

FIG. 10A is a side view and FIG. 10B is a longitudinal sectional view.

FIG. 12A is a three-plane view and FIG. 12B is a longitudinal sectional view.

DETAILED DESCRIPTION

Figure 1:
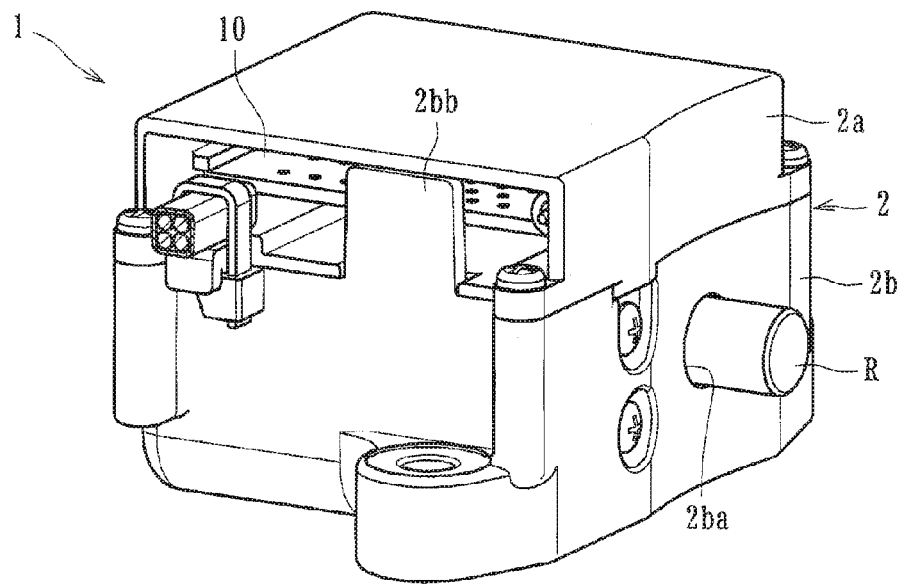
FIG. 1 is an outer appearance view showing a steering lock device according to an embodiment of the present invention.
Figure 2:
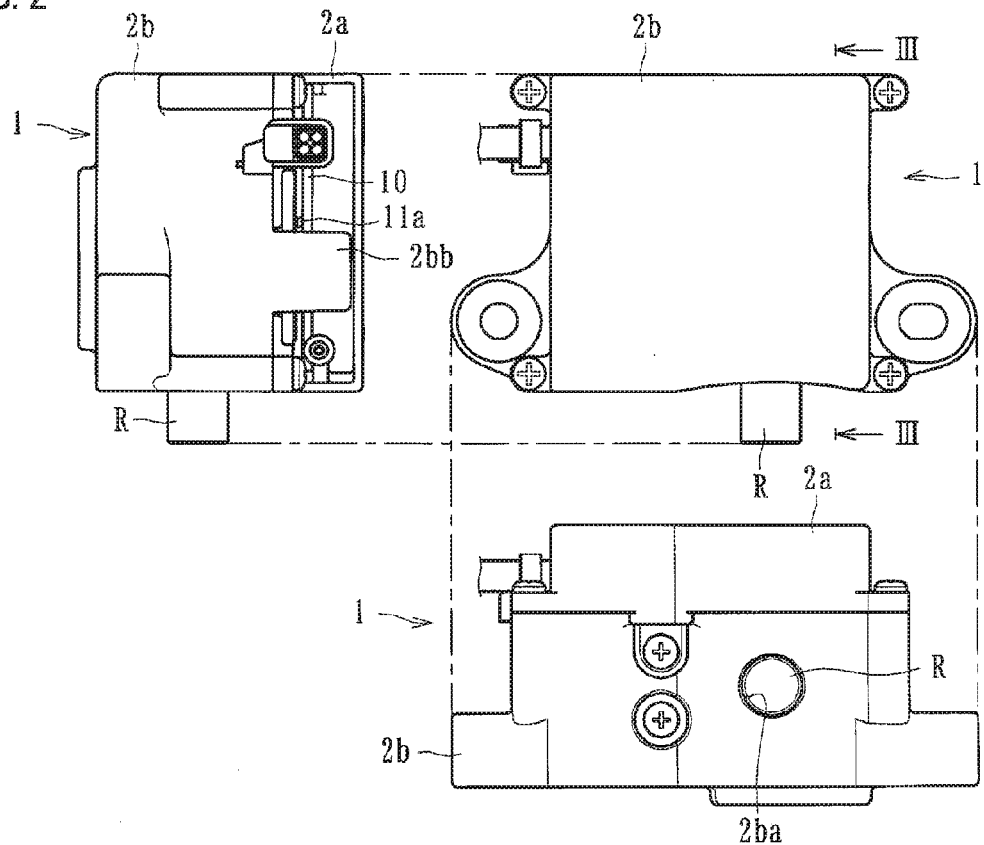
FIG. 2 is a three-plane view showing an outer appearance of the steering lock device.
Figure 3:
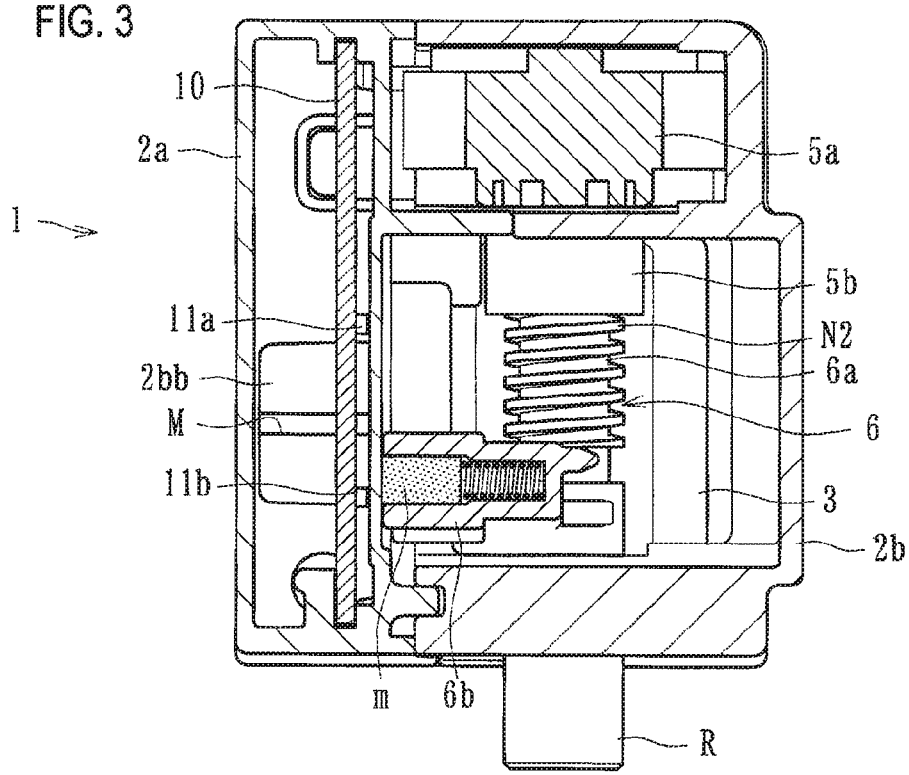
FIG. 3 is a sectional view taken along a line III-III shown in FIG. 2.

Hereinafter, an embodiment of the present invention will be described in detail with reference to the drawings.

A steering lock device 1 according to the present embodiment includes a lock bar attached to a case member. The steering lock device 1 is capable of performing the steering lock in such a way that the lock bar is advanced into a projected state and is thus locked to a steering of a vehicle. The steering lock device 1 is capable of performing the release of the steering lock in such a way that the lock bar is retreated into a retracted state and the locking of the lock bar to the steering is thus released. As shown in FIGS. 1 to 9, the steering lock device 1 includes a case member 2, a motor 3, a driving gear member 4, a driven gear member 5, a feed screw member 6, a lock bar R, an overload protection module 7 and a substrate 10.

The case member 2 constitutes a housing of the steering lock device 1. The case member 2 is formed into a box shape by matching an upper case member 2*a* in which the substrate 10 or the like is accommodated and a lower case member 2*b* in which the motor 3 and the feed screw member 6 or the like are accommodated. The lower case member 2*b* is formed with an insertion hole 2*ba* through which the lock bar R is inserted. The lock bar R is movable between a state (see FIGS. 5A and 8A) of being projected from the insertion hole 2*ba* and a state (see FIGS. 5B and 8B) of being retracted into the insertion hole 2*ba*.

The motor 3 is an actuator which is attached to a predetermined position of the lower case member 2*b* and which can be normally or reversely driven by energization. The motor 3 is configured such that an output shaft 3*a* can be normally rotated during the normal driving and the output shaft 3*a* can be reversely rotated during the reverse driving. That is, the motor 3 is controlled by a control circuit formed on the substrate 10, and the normal driving and the reverse driving thereof are selectively performed at any timing.

The driving gear member 4 is attached to the output shaft 3*a* of the motor 3 and is rotatable together with the output shaft 3*a*. A gear G1 (teeth surface) is formed on an outer peripheral surface of the driving gear member 4. Thus, when the motor 3 is normally driven, the output shaft 3*a* and the driving gear member 4 are normally rotated together. Further, when the motor 3 is reversely driven, the output shaft 3*a* and the driving gear member 4 are reversely rotated together. The gear G1 of the driving gear member 4 is assembled by being meshed with a gear G2 of the driven gear member 5.

The driven gear member 5 is assembled in a state of being meshed with the driving gear member 4 and is rotatable in a direction corresponding to the rotation direction of the driving gear member 4. A female thread N1 is formed on an inner peripheral surface of the driven gear member 5. The female thread N1 is meshed with a male thread N2 of the feed screw member 6. Thus, when the motor 3 is normally driven and the driving gear member 4 is thus normally rotated or when the motor 3 is reversely driven and the driving gear member 4 is thus reversely rotated, the driven gear member 5 is rotated (rotated in the direction opposite to the driving gear member 4) in conjunction with the driving gear member 4.

Figure 10A:
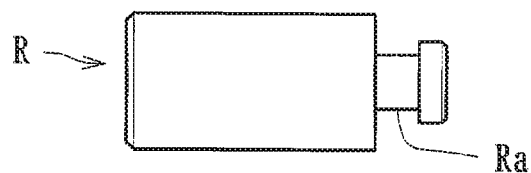
FIGS. 10A and 10B are schematic views showing the lock bar in the steering lock device.
Figure 10B:
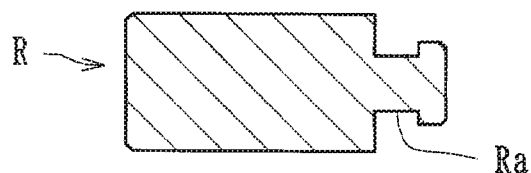
Figure 12A:
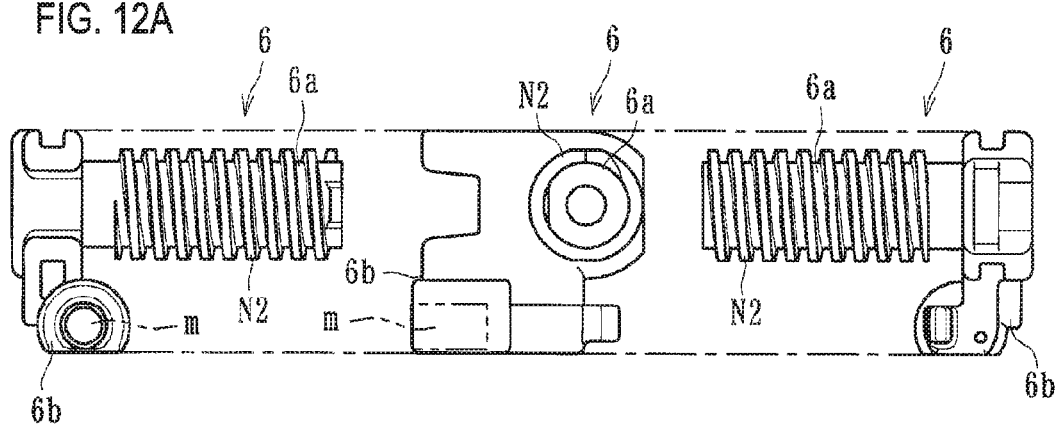
FIGS. 12A and 12B are schematic views showing a feed screw member in the steering lock device.
Figure 12B:
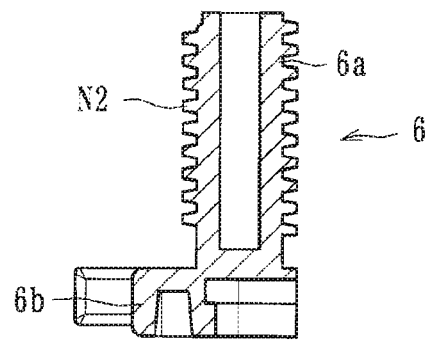

The feed screw member 6 is connected coaxially with the lock bar R and is formed with the male thread N2 which is screwed with the female thread N1 of the driven gear member 5. As the driven gear member 5 is rotated, the lock bar R can be advanced or retreated in an axial direction. As shown in FIGS. 12A and 12B, the feed screw member 6 is composed of a shaft portion 6*a* which is formed with the male thread N2 and an arm portion 6*b* to which a magnet m is attached. That is, a connection portion Ra (see FIG. 10A) is formed at a base end of the lock bar R. By rating the connection portion Ra to the shaft portion 6*a* of the feed screw member 6, the lock bar R and the feed screw member 6 are connected coaxially.

Thus, when the motor 3 is normally driven in the state (see FIGS. 5B and 8B) where the lock bar R is retracted, the driving gear member 4 is normally rotated and the driven gear member 5 is thus rotated in the opposite direction in conjunction with the driving gear member 4. Therefore, the feed screw member 6 and the lock bar R are advanced by the meshing of the female thread N1 and the male thread N2 and a leading end of the lock bar R can be locked by being inserted through a locked hole F formed in a steering of a vehicle. In this way, the lock of the steering is performed.

On the other hand, when the motor 3 is reversely driven in the state (see FIGS. 5A and 8A) where the lock bar R is projected, the driving gear member 4 is reversely rotated and the driven gear member 5 is thus rotated in the opposite direction in conjunction with the driving gear member 4. Therefore, the feed screw member 6 and the lock bar R are retreated by the meshing of the female thread N1 and the male thread N2 and the leading end of the lock bar R can be pulled out from the locked hole F formed in the steering of the vehicle. In this way, the lock of the steering is released.

Further, hall ICs 11*a*, 11*b* (magnetic sensor) are respectively attached to the substrate 10 according to the present embodiment. The hall ICs 11*a*, 11*b* are capable of transmitting On/Off electrical signals by detecting the magnetism of the magnet m attached to the feed screw member 6. The hall IC 11*a* constitutes a retracted state detection module for detecting that the lock bar R is in the retracted state (i.e., unlock state). The hall IC 11*a* is attached to a portion (predetermined portion on the substrate 10) on which the magnet m is positioned when the lock bar R is in the retracted state. Further, the hall IC 11*b* constitutes a projected state detection module for detecting that the lock bar R is in the projected state (i.e., lock state). The hall ICs 11*a*, 11*b* is attached to a portion (predetermined portion on the substrate 10) on which the magnet m is positioned when the lock bar R is in the projected state.

Then, under the condition that the hall IC 11*a* (retracted state detection module) or the hall IC 11*b* (projected state detection module) detects the retracted state or the projected state of the lock bar R, the driving of the motor 3 is controlled to be stopped by a control circuit formed on the substrate 10. That is, when the hall IC 11*a* (retracted state detection module) detects the magnet m in the course of the lock bar R being retreated, the lock bar R is determined to be in the retracted state, and thus, the driving of the motor 3 can be stopped. Further, when the hall IC 11*b* (projected state detection module) detects the magnet m in the course of the lock bar R being advanced, the lock bar R is determined to be in the projected state, and thus, the driving of the motor 3 can be stopped.

Here, as shown in FIGS. 5A, 5B and 8A, 8B, the steering lock device 1 according to the present embodiment is configured such that the motor 3, and the feed screw member 6 and the lock bar R are accommodated in parallel within the case member 2. Specifically, as shown in FIGS. 5A, 5B and 8A, 89, the motor 3 is disposed along an axis L1 (the output shaft 3*a* of the motor 3 is disposed to match the axis L1), and the feed screw member 6 and the lock bar R are disposed along an axis L2 substantially parallel to the axis L1 (longitudinal directions of the feed screw member 6 and the lock bar R are disposed to match the axis L2).

Figure 4:
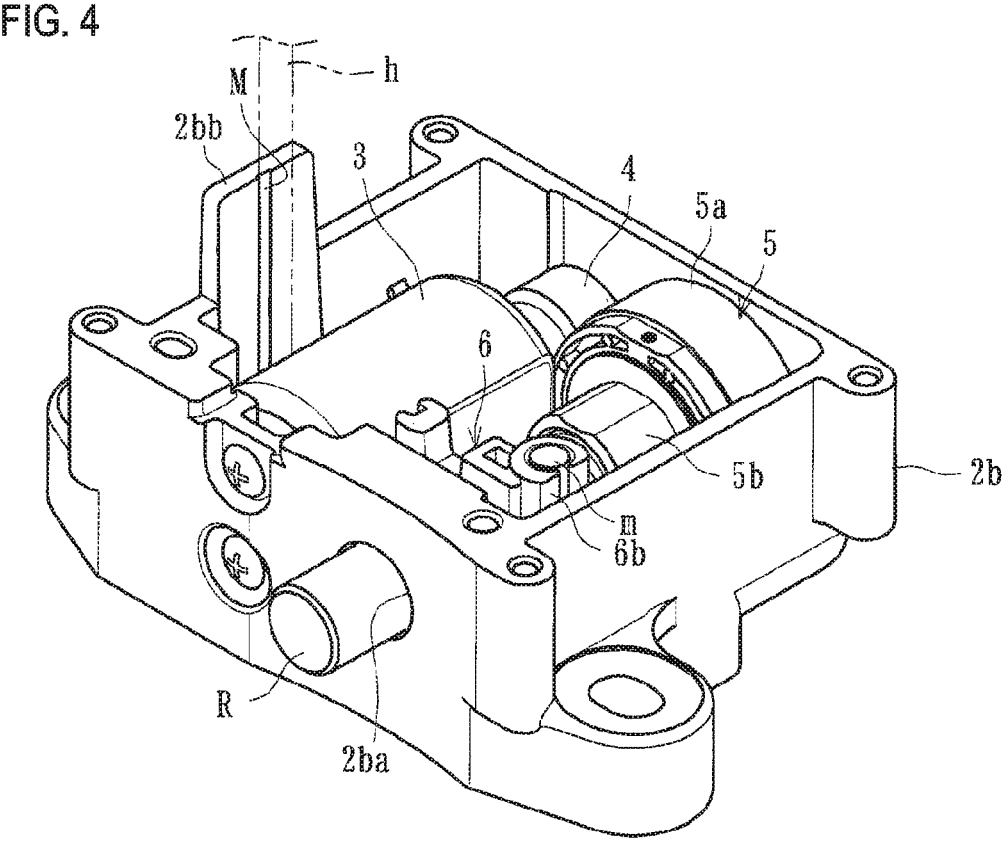
FIG. 4 is a perspective view showing an internal configuration of the steering lock device (in a state where an upper case member is detached).
Figure 5A:
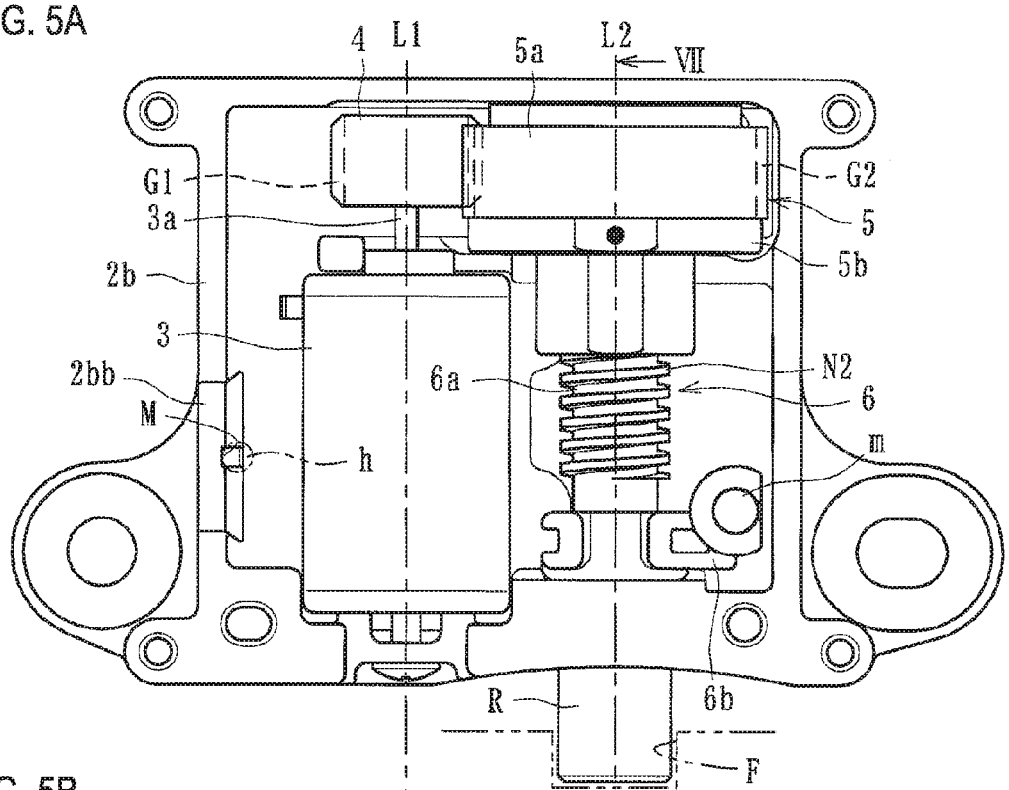
FIGS. 5A and 5B are plan views showing an interior of the steering lock device (in the state where the upper case member is detached)
Figure 5B:
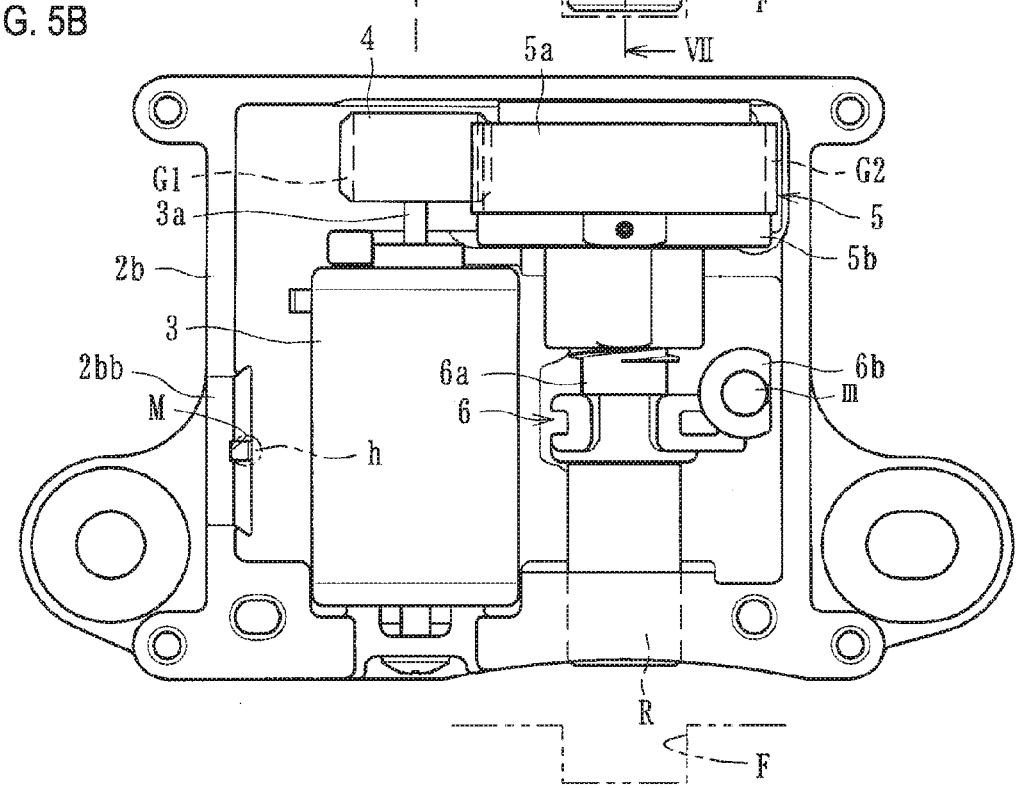
Figure 6:
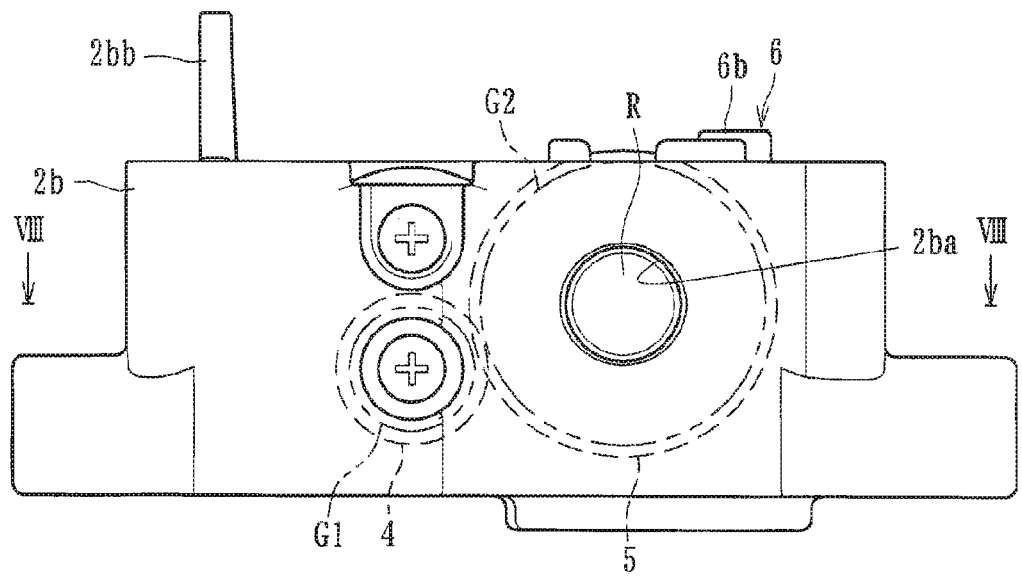
FIG. 6 is a front view showing the steering lock device (in the state where the upper case member is detached).
Figure 7:
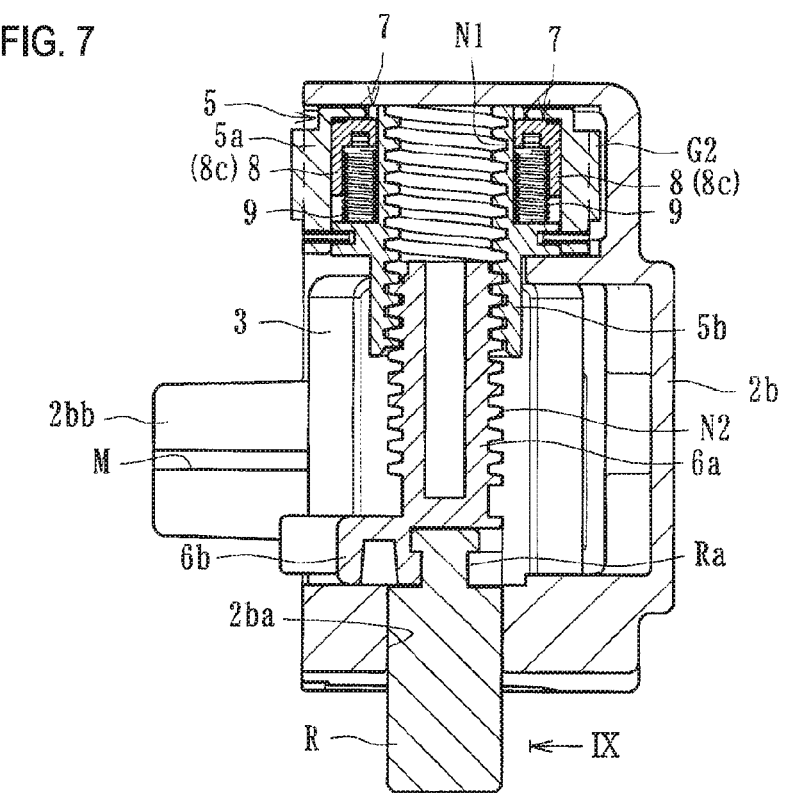
FIG. 7 is a sectional view taken along a line VII-VII shown in FIG. 5A.
Figure 8A:
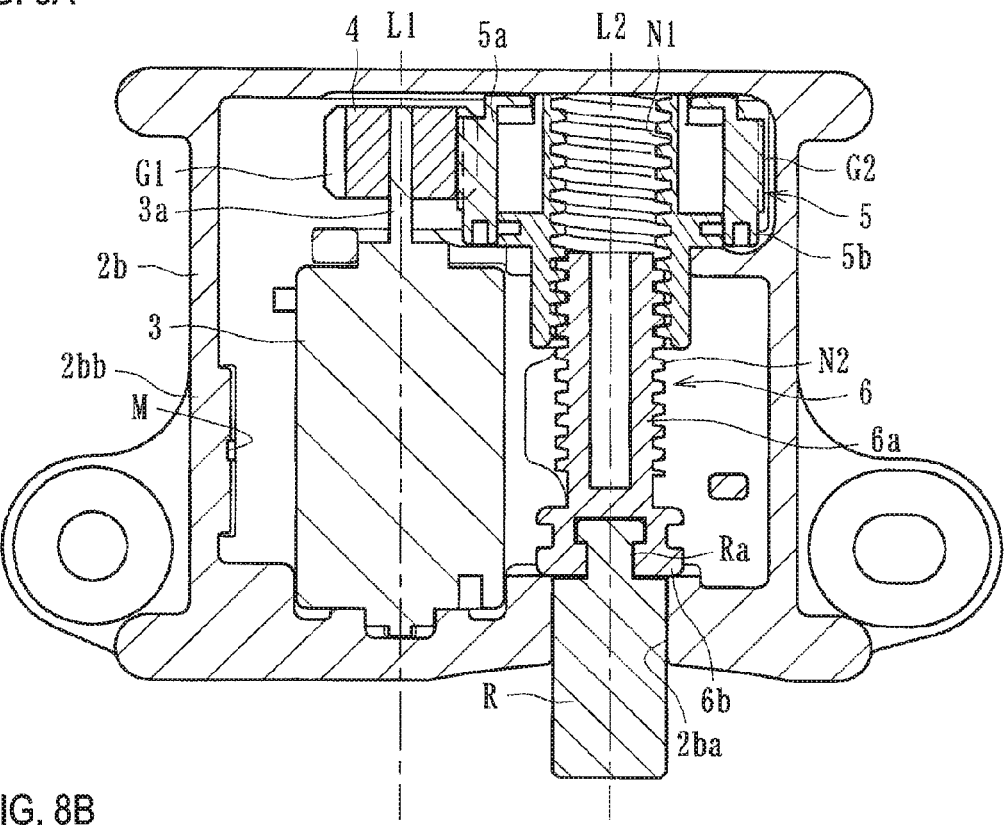
FIGS. 8A and 8B are sectional views taken along a line VIII-VIII shown in FIG. 6.
Figure 8B:
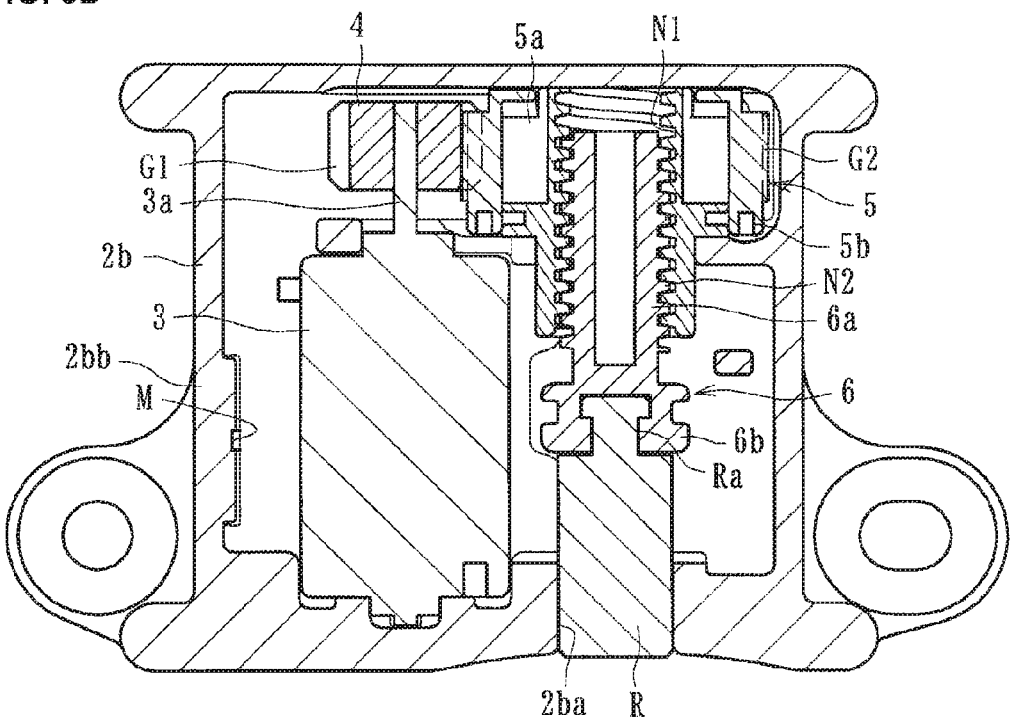

Further, as shown in FIG. 1, a wall portion 2*bb* whose upper end extends to the vicinity of the upper case member 2*a* is formed integrally in an edge portion of the lower case member 2*b* in the steering lock device 1 according to the present embodiment. As shown in FIG. 4, a groove M vertically extending is formed in an inner peripheral surface of such wall portion 2*bb* and a wiring h is inserted through the groove M. The wiring h can be connected to the motor 3, thereby applying a voltage. In this way, it is possible to prevent a third party from improperly energizing the motor 3 and thus performing the steering lock or the release thereof.

Furthermore, the driven gear member 5 according to the present embodiment is configured by combining a first driven gear member 5*a* on the outer side and a second driven gear member 5*b* on the inner side. That is, the gear G2 to be meshed with the gear G1 of the driving gear member 4 is formed in an outer peripheral surface of the first driven gear member 5a and the female thread N1 to be meshed with the male thread N2 of the feed screw member 6 is formed in an inner peripheral surface of the second driven gear member 5b. The first driven gear member 5a and the second driven gear member 5b are combined, thereby constituting the driven gear member 5.

Figure 13:
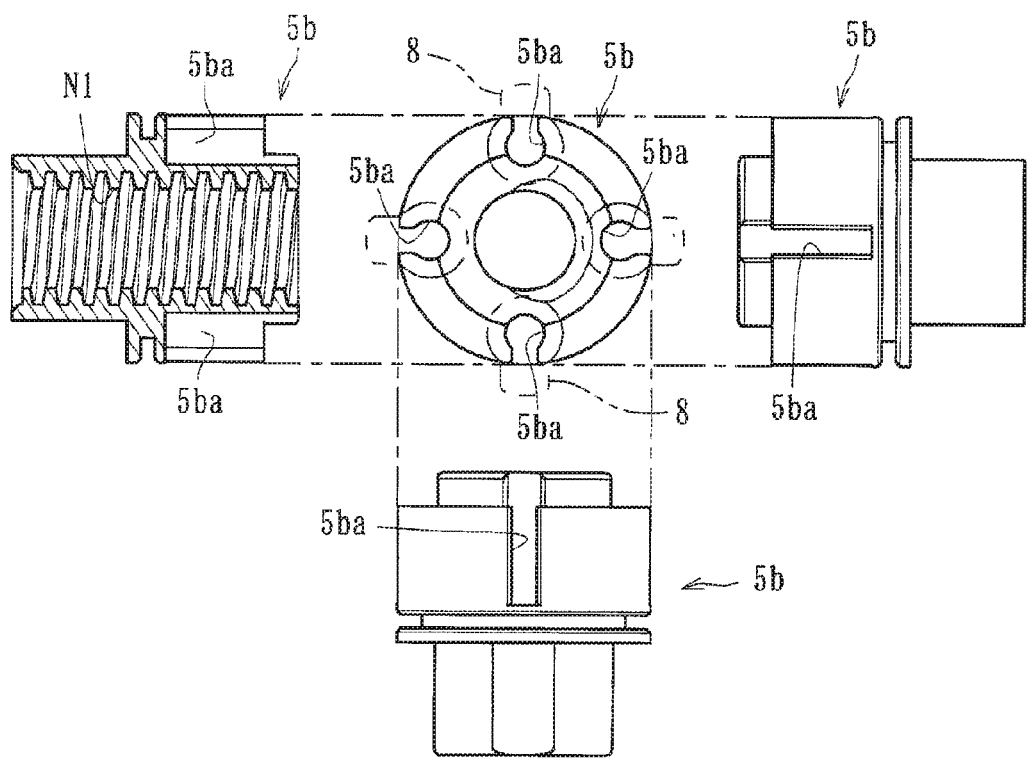
FIG. 13 is a three-plane view and a sectional view showing a second driven gear member in the steering lock device.
Figure 14:
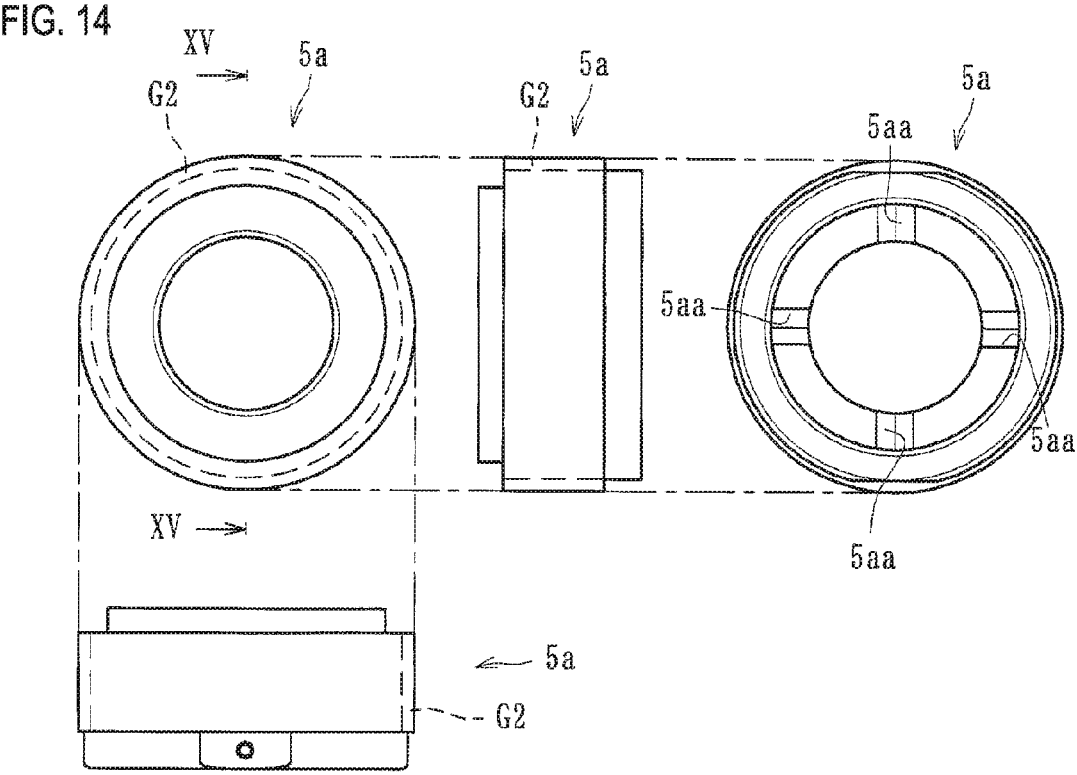
FIG. 14 is a four-plane view showing a first driven gear member in the steering lock device.
Figure 15:
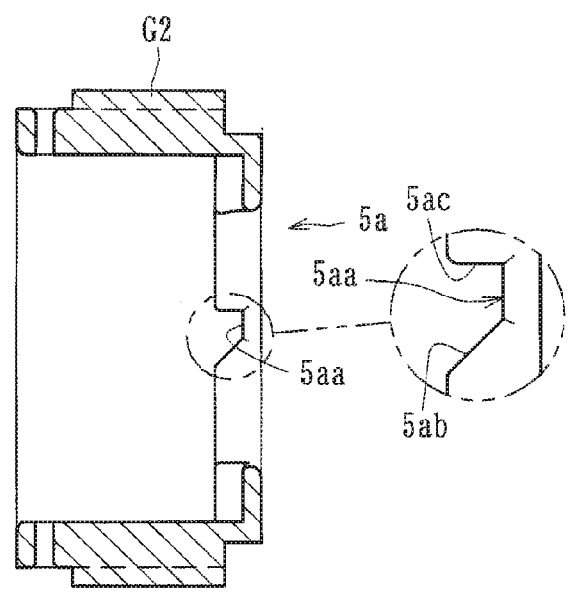
FIG. 15 is a sectional view taken along a line XV-XV shown in FIG. 14.

More specifically, as shown in FIGS. 14 and 15, the first driven gear member 5a is composed of a cylindrical member having an outer peripheral surface on which the gear G2 is formed, and fitting holes 5aa are respectively formed at predetermined positions (in the present embodiment, four positions on the concentric circle) of the first driven gear member 5a. As shown in FIGS. 9 and 15, each of the fitting holes 5aa is formed in a concave shape which has an inclined surface 5ab inclined in a predetermined angle and a vertical wall surface 5ac. Further, as shown in FIG. 13, the second driven gear member 5b is composed of a cylindrical member having an inner peripheral surface on which the female thread N1 is formed, and accommodation grooves 5ba are respectively formed at predetermined positions respectively corresponding to the fitting holes 5aa. As shown in FIG. 13, each of the accommodation grooves 5ba is formed in a notch shape extending in the axial direction and is adapted to slidably accommodate each of sliders 8 (to be described below).

By the way, in the present embodiment, the overload protection module 7 composed of a torque limiter is assembled by being interposed between the first driven gear member 5a and the second driven gear member 5b. Such overload protection module 7 can block the transmission of a driving force of the motor 3 to the lock bar R when an overload occurs in the course of the lock bar R being advanced (i.e., in the course of the lock bar R being moved from the retracted state to the projected state). The overload protection module 7 is configured by including the sliders 8 assembled by being fitted to the fitting holes 5aa. Meanwhile, as a cause of occurrence of the overload, the case where the lock bar R is advanced at a position of not matching the locked hole F or the case where foreign matters are present at an advancing path of the lock bar R, or the like, is assumed.

Figure 11:
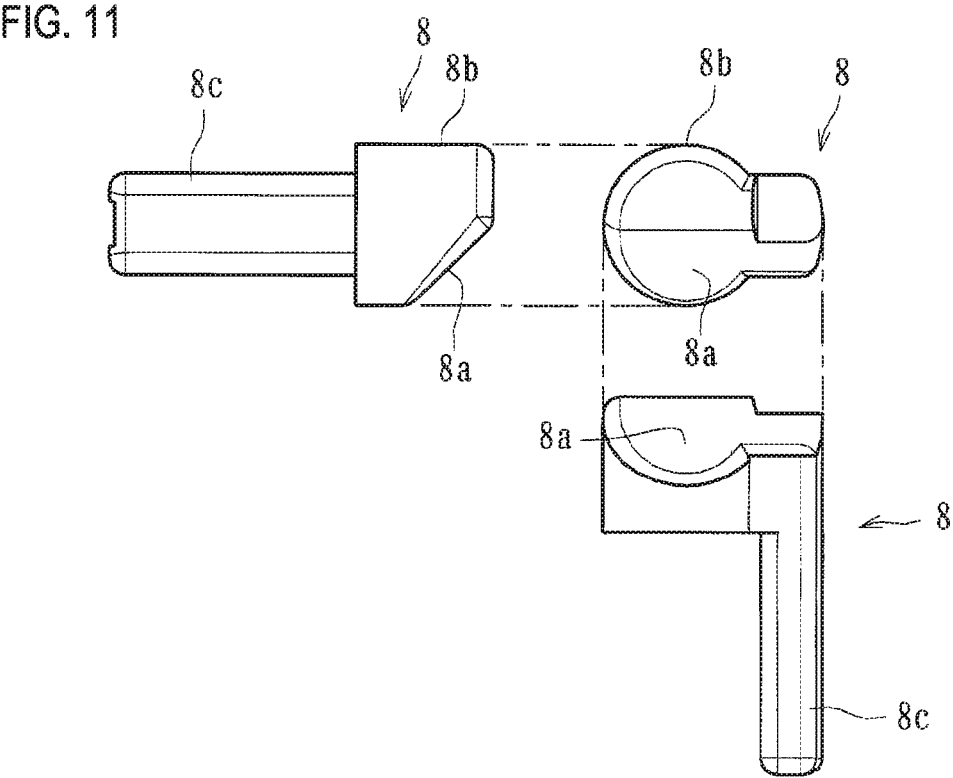
FIG. 11 is a three-plane view showing a slider in the steering lock device.

As shown in FIG. 11, each slider 8 constituting the overload protection module 7 is composed of a piece member which has an inclined surface 8a corresponding to the inclined surface 5ab of each fitting hole 5aa, a wall surface 8b corresponding to the wall surface 5ac of each fitting hole 5aa and a shaft portion 8c to which a spring 9 is attached. In the state of being accommodated in each accommodation groove 5ba of the second driven gear member 5b, each slider 8 can be fitted while being normally biased by each spring 9 in the state where the inclined surface 8a faces the inclined surface 5ab of each fitting hole 5aa and the wall surface 8b faces the wall surface 5ac of each fitting hole 5aa, as shown in FIG. 9.

Thus, when an overload does not occur in the course of the lock bar R being advanced from the retracted state, each slider 8 is held in a state of being pressed and fitted to each fitting hole 5aa by the biasing forces of each spring 9. Therefore, the first driven gear member 5a and the second driven gear member 5b are integrated and rotated in a direction of "a" in FIG. 9. On the other hand, when an overload occurs in the course of the lock bar R being advanced from the retracted state, the inclined surfaces 5ab of the first driven gear member 5a and the inclined surfaces 8a of the sliders 8 serve as a cam, and thus, the sliders 8 are moved (moved downwardly in FIG. 9) against the biasing force of the springs 9.

In this way, the fitting of the sliders 8 to the fitting holes 5aa is released and the first driven gear member 5a is continuously rotated in the direction of "a" in FIG. 9. However, the transmission of the driving force of the motor 3 is released, and thus, the second driven gear member 5b is in a state of being stopped. That is, when an overload occurs in the course of the lock bar R being advanced, the first driven gear member 5a is idled with respect to the second driven gear member 5b, thereby serving as a torque limiter. Meanwhile, in the course of the lock bar R being retreated from the projected state, the wall surfaces 5ac of the first driven gear member 5a are abutted against the wall surfaces 8b of the sliders 8, as shown in FIG. 9. Accordingly, the action of the cam does not occur, so that the first driven gear member 5a and the second driven gear member 5b are integrally rotated in a direction of "b" in FIG. 9.

Figure 16:
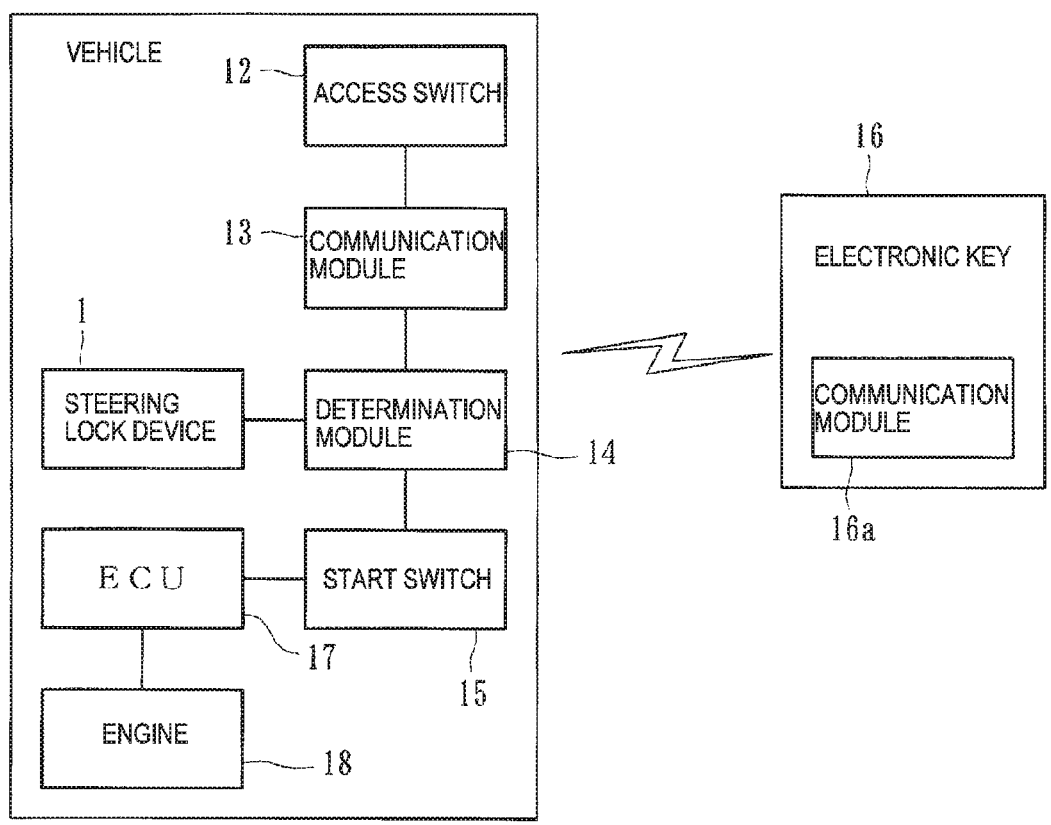
FIG. 16 is a block diagram showing a connection relationship of the steering lock device.

Next, an operation of the steering lock device 1 according to the present embodiment will be described with reference to a block diagram shown in FIG. 16.

On arbitrary portions on the vehicle side, an access switch 12 and a start switch 15, which can be arbitrarily operated by a driver, are disposed, and also, a communication module 13 including an antenna or the like, a determination module 14 composed of a microcomputer or the like, and an ECU 17 for controlling the driving of the engine 18, or the like, are disposed. Further, a communication module 16a capable of communicating with the communication module 13 on the vehicle side is formed in an electronic key 16 which can be carried by a driver.

First, during the stopping of a vehicle, the lock bar R of the steering lock device 1 is in a projected state and is locked to the locked hole F, so that a steering of a vehicle is in a locked state. Then, when the access switch 12 is operated by a driver, a predetermined signal is wirelessly transmitted in the low frequency from the communication module 13. When the communication module 16a of the electronic key 16 receives the signal, the received signal is analyzed and then a vehicle-specific ID code is wirelessly transmitted in the high frequency.

Then, when the communication module 13 receives the ID code transmitted from the communication module 16a, the determination module 14 determines whether or not the received ID code is a regular one. When it is determined that the received ID code is the regular one, a signal for unlocking is transmitted to the steering lock device 1 via CAN communication. Upon receiving the signal for unlocking, the steering lock device 1 energizes the motor 3 to reversely rotate the output shaft 3a. In this way, the feed screw member 6 and the lock bar R are retreated together, and the driving of the motor 3 is stopped under the condition that the hall IC 11a (retracted state detection module) detects the magnet m within a predetermined time.

Then, when the hall IC 11a (retracted state detection module) detects the magnet m within a predetermined time, the lock bar R is switched to the retracted state from the projected state, and thus, it can be determined that the steering lock is released. Accordingly, the unlocking completion signal is transmitted to the determination module 14 via the CAN communication. When the start switch 15 is operated by a driver after the determination module 14 receives the unlocking completion signal in this manner, a main power supply of a vehicle is turned on and the engine 18 can be started by controlling the ECU 17.

On the other hand, when stopping a vehicle after the engine 18 is started as described above, a driver operates the access switch 12. Then, it is determined, with reference to the information of the ECU 17, whether or not a vehicle speed is 0 (zero). Then, when it is determined that the vehicle speed is 0, the main power supply of the vehicle is turned off and the engine 18 is stopped. Then, an engine stop signal is transmitted to the determination module 14 from the ECU 17 and a signal for locking is transmitted to the steering lock device 1 via the CAN communication.

Upon receiving the signal for locking, the steering lock device 1 rotates the output shaft 3*a* in a normal direction by energizing the motor 3. In this way, the feed screw member 6 and the lock bar R are advanced together, and the driving of the motor 3 is stopped under the condition that the hall IC 11*b* (projected state detection module) detects the magnet m within a predetermined time. Here, when an overload occurs during the advancing of the lock bar R, the transmission of the driving force of the motor 3 to the lock bar R is blocked by the overload protection module 7.

Then, when the hall IC 11*b* (the projected state detection module) detects the magnet m within a predetermined time, the lock bar R is switched to the projected state from the retracted state, and thus, it can be determined that the steering is locked. Accordingly, a lock completion signal is transmitted to the determination module 14 via the CAN communication. After the determination module 14 receives the lock completion signal in this manner, a series of control and operation for the stopping of the vehicle is terminated.

According to the present embodiment, the lock bar R can be advanced or retreated in accordance with the rotation direction of the output shaft 3*a* of the motor 3. Therefore, both the steering lock and the release thereof can be performed by an electric power. Further the motor 3, the feed screw member 6 and the lock bar R are accommodated in parallel within the case member 2. Therefore, it is possible to reduce the whole size of the device, as compared with a device of requiring a cam or a latch mechanism or the like.

Further, the hall IC 11*a* (the retracted state detection module) for detecting the retracted state of the lock bar R and the hall IC 11*b* (the projected state detection module) for detecting the projected state of the lock bar R are provided and the driving of the motor 3 is stopped under the condition that the retracted state or the projected state of the lock bar R is detected by the hall ICs (11*a*, 11*b*). Therefore, the lock bar R can be reliably in the retracted state or the projected state.

Particularly, in the present embodiment, the magnet m is attached to the feed screw member 6, and the retracted state detection module and the projected state detection module are composed of the hall ICs (11*a*, 11*b*) which are magnetic sensors capable of detecting the retracted state and the projected state of the lock bar R by detecting the magnetism of the magnet m. Accordingly, it is possible to detect the retracted state or the projected state of the lock bar R in a non-contact manner. Meanwhile, the retracted state detection module and the projected state detection module are not limited to the hall IC but may use other magnetic sensor. Furthermore, instead of the magnetic sensor, other type of a non-contact or contact sensor may be employed.

In addition, according to the present embodiment, the lock bar R can be advanced or retreated in accordance with the rotation direction of the output shaft 3*a* of the motor 3. Therefore, both the steering lock and the release thereof can be performed by an electric power. Further, the overload protection module 7 is provided which is capable of blocking the transmission of the driving force of the motor 3 to the lock bar R when an overload occurs in the course of the lock bar R being advanced. Therefore, even when the locking of the lock bar R to the steering is not favorably performed, it is possible to prevent defects from occurring in the motor 3 or the like.

Further, the overload protection module 7 according to the present embodiment is composed of a torque limiter (an overload clutch having the slider 8) which is interposed between the first driven gear member 5*a* and the second driven gear member 5*b*. When an overload occurs in the lock bar R, the first driven gear member 5*a* is idled with respect to the second driven gear member 5*b*. In this way, it is possible to reliably protect the motor 3 or the like from the overload by a simple structure.

Although the present embodiment has been described in the foregoing section, the present invention is not intended to be limited thereto. For example, the overload protection module 7 may be omitted. Further, in the present embodiment, the retracted state detection module (in the present embodiment, the hall IC 11*a*) for detecting the retracted state of the lock bar R and the projected state detection module (in the present embodiment, the hall IC 11*b*) for detecting the projected state of the lock bar R are provided. However, the retracted state detection module and the projected state detection module may be omitted and other module may detect whether the lock bar R is in the retracted state or the projected state, thereby stopping the motor 3. Meanwhile, although the present embodiment has been applied to a motorcycle, the present invention may be applied to other forms of vehicles.

The steering lock device may have a different outer appearance or may have an additional other function, as long as the steering lock device is characterized in that the motor, the feed screw member and the lock bar are accommodated in parallel within the case member.

Further, the motor 3, the feed screw member 6 and the lock bar R may not be accommodated in parallel within the case member 2.

The steering lock device may also have a different outer appearance or may have an additional other function, as long as the steering lock device includes the overload protection module capable of blocking the transmission of the driving force of the motor to the lock bar when an overload occurs in the course of the lock bar being advanced.

What is claimed is:

1. A steering lock device which performs a steering lock in such a way that a lock bar is advanced into a projected state and is thus locked to a steering of a vehicle, and releases the steering lock in such a way that the lock bar is retreated into a retracted state and the locking of the lock bar to the steering is thus released, the steering lock device comprising:

a case member;

a lock bar attached to the case member;

a motor having an output shaft which is arbitrarily rotatable in a normal direction and in a reverse direction;

a driving gear member which is attached to the output shaft of the motor and which is rotatable together with the output shaft;

an overload protection module configured to block the transmission of a driving force of the motor to the lock bar when an overload occurs in the course of the lock bar being advanced;

a driven gear member which is assembled in a state of being meshed with the driving gear member, which is rotatable in a direction corresponding to a rotation direction of the driving gear member and which has a female thread; and a feed screw member which is connected coaxially with the lock bar, which has a male thread screwed with the female thread of the driven gear member and which is capable of causing the lock bar to advance or retreat in an axial direction by the rotation of the driven gear member, wherein the motor, the feed screw member and the lock bar are accommodated in parallel within the case member, wherein the driven gear member comprises a first driven gear member having a gear which is meshed with the driving gear member and a second driven gear member having the female thread, wherein the overload protection module comprises a torque limiter which is interposed between the first driven gear member and the second driven gear member, wherein the torque limiter comprises:
- a slider which is slidably accommodated in an accommodation groove formed in the second drive gear member;
- a fitting hole which is formed in the first driven gear member; and
- a spring which is configured to press the slider toward the fitting hole, wherein the fitting hole has an inclined surface, and the slider has an inclined surface which is configured to face the inclined surface of the fitting hole, and wherein when an overload occurs in the lock bar, the slider moves along the inclined surface of the fitting hole such that fitting of the slider to the fitting hole is released, so that the first driven gear member is idled with respect to the second driven gear member.

2. The steering lock device according to claim 1, further comprising:
- a retracted state detection module configured to detect the retracted state of the lock bar; and
- a projected state detection module configured to detect the projected state of the lock bar, wherein the driving of the motor is stopped under the condition that the retracted state detection module or the projected state detection module detects the retracted state or projected state of the lock bar.

3. The steering lock device according to claim 2, wherein a magnet is attached to the feed screw member, and wherein the retracted state detection module and the projected state detection module comprise magnetic sensors configured to detect the retracted state and the projected state of the lock bar by detecting the magnetism of the magnet.

* * * * *

UNITED STATES PATENT AND TRADEMARK OFFICE
CERTIFICATE OF CORRECTION

PATENT NO. : 9,889,817 B2
APPLICATION NO. : 15/334602
DATED : February 13, 2018
INVENTOR(S) : Michiyuki Suzuki et al.

It is certified that error appears in the above-identified patent and that said Letters Patent is hereby corrected as shown below:

In the Specification

Column 5, Line 52, "By rating" should read --By fitting--

Column 6, Line 44, "8A, 89" should read --8A, 8B--

Signed and Sealed this
Twelfth Day of June, 2018

Andrei Iancu
*Director of the United States Patent and Trademark Office*